May 6, 1952      E. P. SACREY      2,596,081
HAND MANIPULATED POWER BAND SAW
Filed June 10, 1947      2 SHEETS—SHEET 1
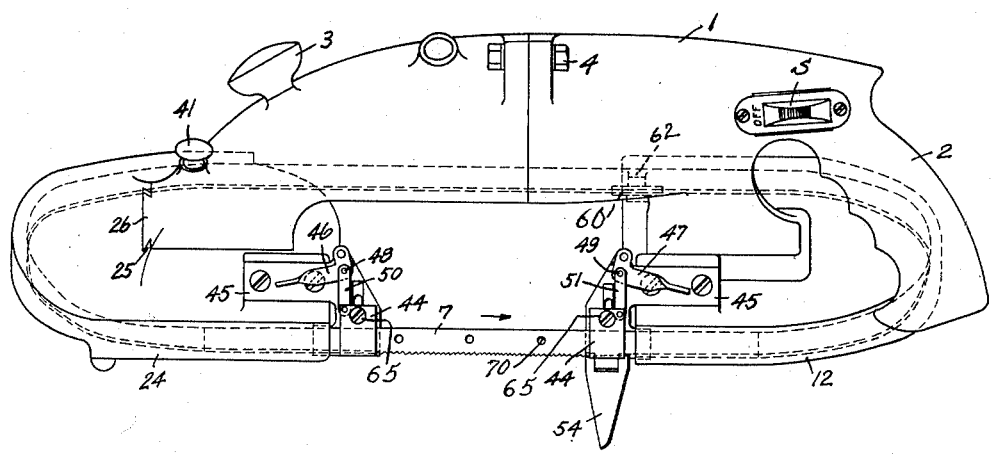
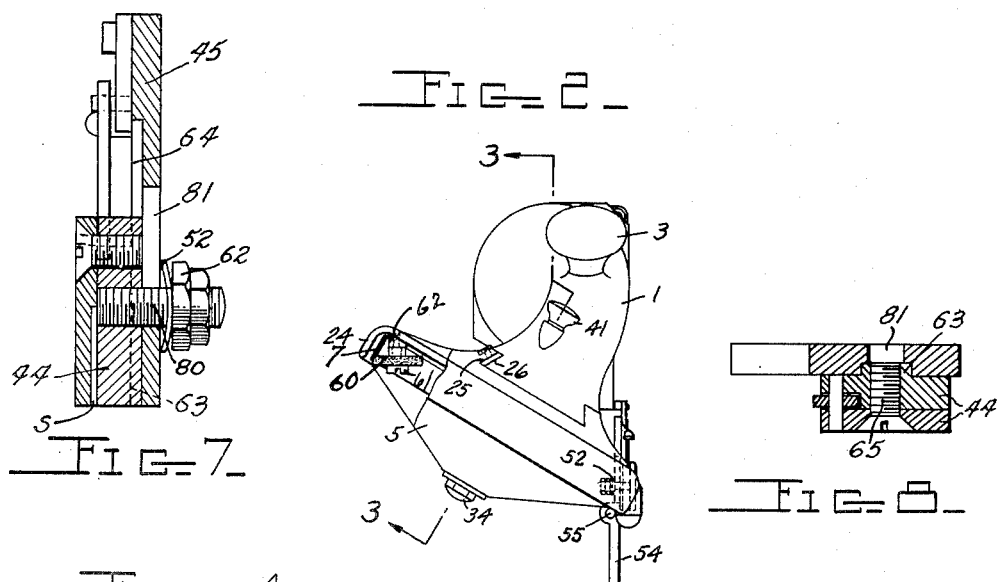
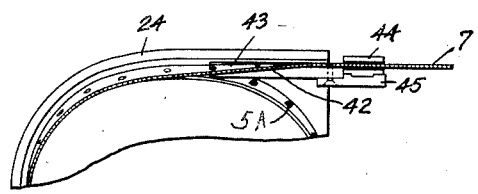
INVENTOR:
Elmer P. Sacrey,
BY
Bodell & Thompson
ATTORNEYS.

May 6, 1952  E. P. SACREY  2,596,081
HAND MANIPULATED POWER BAND SAW
Filed June 10, 1947  2 SHEETS—SHEET 2
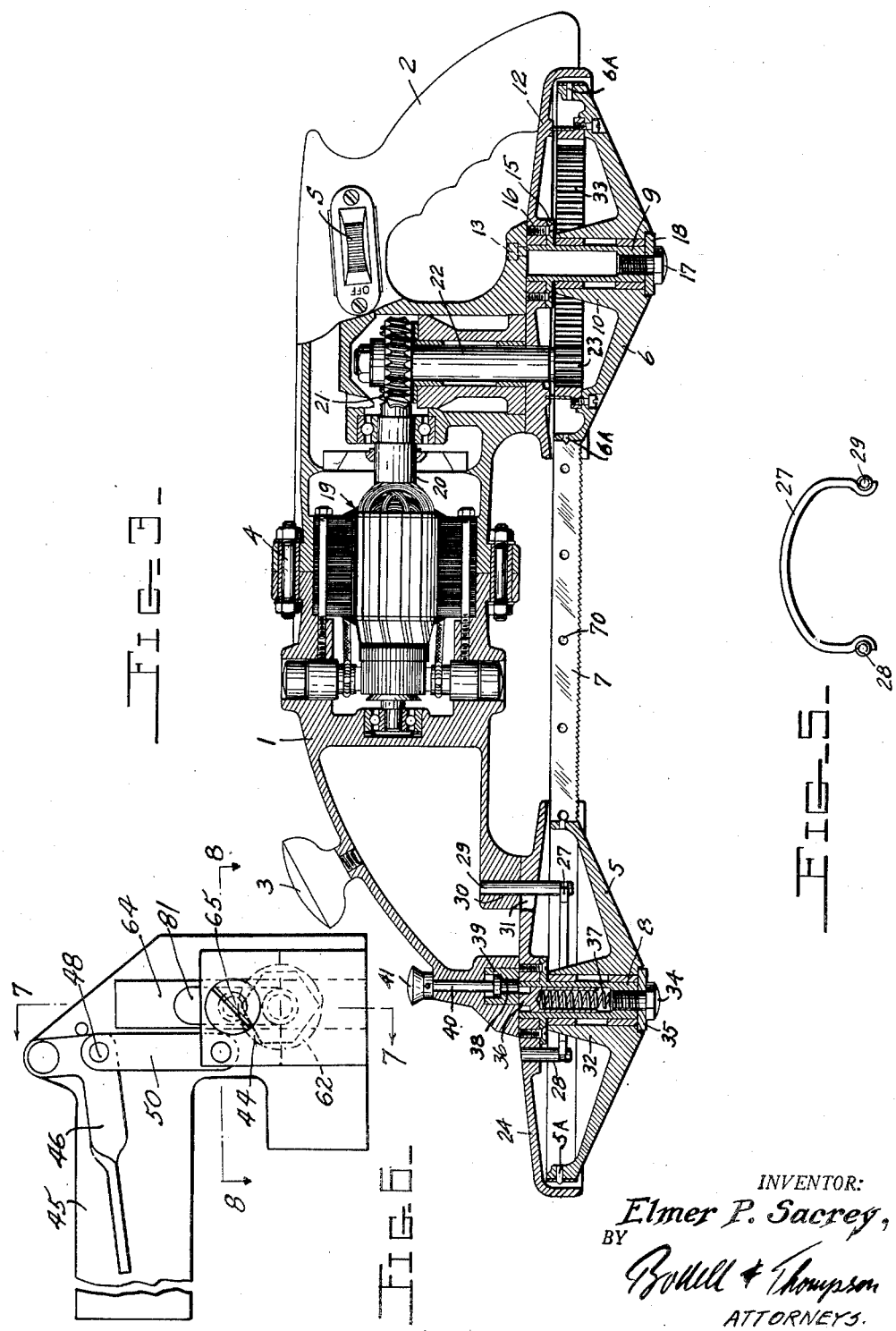
INVENTOR:
Elmer P. Sacrey,
BY
Boswell & Thompson
ATTORNEYS.

Patented May 6, 1952

2,596,081

UNITED STATES PATENT OFFICE 2,596,081

HAND MANIPULATED POWER BAND SAW

Elmer P. Sacrey, Syracuse, N. Y.

Application June 10, 1947, Serial No. 753,651

6 Claims. (Cl. 143—19)

This invention relates to hand manipulated power band saws, and has for its object a particularly simple arrangement of the band relatively to the casing in which the motor is mounted and the sprocket wheels over which the band runs. It also has for its object, an arrangement of the sprocket wheels at on oblique or inclined angle relatively to the vertical plane of the portion of the band saw moving through the cutting zone.

It further has for its object, a band having perforations spaced to receive teeth, or pins, on the sprocket wheels, and also means for guiding the portions of the perforated saw band leaving one of the toothed sprocket wheels tangentially and entering the cutting zone into the vertical plane, and also guiding the portion leaving the cutting zone from the vertical plane into a plane tangent to the other sprocket wheel.

The invention also has for its object, means for holding portions of the band at opposite ends of the cutting zone in a vertical plane independently of the guiding means.

The invention further has for its object, a particularly simple and efficient mechanism operable to permit one sprocket wheel to be shifted toward the other for producing slack in the band when the band is to be removed or replaced on the sprocket wheels.

The invention consists in the novel features and in the combinations and constructions hereinafter set forth and claimed.

In describing this invention, reference is had to the accompanying drawings in which like characters designate corresponding parts in all the views.

Figure 1 is a side elevation of this power band saw.

Figure 2 is an end view, looking to the right in Figure 1.

Figure 3 is an elevation, partly in section, taken on the plane of line 3—3, Figure 2.

Figure 4 is a fragmentary view of one of the sprocket wheels and contiguous parts, looking upward at the left of Figure 1, showing the guiding means for twisting the saw out of a plane tangent to the pulley or sprocket wheel into a vertical plane when entering the cutting zone.

Figure 5 is a detail view of the spring for biasing the sprocket wheel, which is shiftable radially toward the other for producing slack in the band.

Figure 6 is an enlarged elevation of the means holding the portion of the saw band in the cutting zone firmly in vertical position.

Figures 7 and 8 (sheet 1) are sectional views on lines 7—7 and 8—8, Figure 6.

This band saw includes generally, a horizontal casing, wheels mounted on the casing at opposite ends thereof, a saw band running over the wheels with the outer run of the band farthest from the casing between the wheels being the cutting portion, or the portion which moves through the cutting zone, a motor mounted in the casing, and motion transmitting means between the motor and one of the wheels, and guide means located to twist the band as it leaves one wheel and enters the cutting zone from a plane tangent to the periphery of the wheel into a position, whereby it is at an angle to such plane, and also twists the band as it leaves the cutting zone from its angular position back into a position where it is in a plane tangent to the peripheries of the cutting wheels. The guide means consists of spiral passages to gradually twist the belt as it moves into and out of angular cutting position.

The numeral 1 designates the casing as a whole, this being shown as having a grip handle 2 at its rear end extending in a vertical plane and another handle or knob 3 on its front end. The casing, as a whole, is stream lined, and is shown as composed of front and rear sections, which are secured together, as by clamping screws 4.

5 and 6 are sprocket wheels over which a saw band 7 runs. They are provided with radial pins 5A, 6A, respectively located midway between their cylindrical peripheries and project about the thickness of the band beyond the peripheries, for entering corresponding spaced holes 70 along the median line of the band. These wheels are supported by axles 8 and 9 respectively. The wheel 6 has its hub 10 mounted in a shield 12 for the wheel 6, the shield 12 being secured to the casing, as by screws 13, this shield being located just in front of and at one side of the vertical plane of the grip handle 2. The wheel 6 is mounted on an axle 9, here shown as hollow, or as a sleeve having an annular flange 15 overlying the inner end of an internal hub on the shield 12 and secured thereto, as by screws 16. A screw 17 threads into the outer end of the axle 9 and clamps a washer 18 against the outer face of the wheel 6, thus holding the wheel 6 onto the axle or sleeve 6. The method and machine for spacing the holes equaly in the band, in accordance with the spacing of the sprocket pins, forms no part of the invention.

The numeral 19 designates an electric motor mounted in suitable bearings in the casing 1, or the sections thereof, one bearing in each section, the shaft 20 being in horizontal position and being provided with a worm 21 meshing with a worm wheel on a vertical shaft 22 also suitably mounted in the casing and extending through the shield 12 into the wheel 6 where it is provided with a pinion 23 meshing with internal gear teeth 33 in the wheel 6, so that the wheel 6 is the driving wheel for the saw band 7. Any suitable motion transmitting means between the motor shaft and the sprocket wheel may be used.

The flow of current to the motor is controlled by a suitable switch. S designates the operating member for the switch. The sprocket wheel 5, which is an idler, is mounted in a shield 24 suitably supported in the casing at the front end thereof by ways or grooves 25 in the shield 24 coacting with complemental beveled tongues or ways 26 at the front end of the body 1, the shield being shiftable radially toward and from the wheel 6. It is normally held from shifting movement by a spring tending to press it radially away from the wheel 6 to tighten the band.

This spring is here shown as a U-shaped or looped spring 27 (Figure 5) biased to press forwardly, or to the left, Figures 1 and 3, in one direction against an internal stud 28 in the shield 24, and in the opposite direction to react against the fixed stud 29 extending into the wheel but anchored at 30 to the casing 1, the stud extending into the shield 24 through a slot at 31 which permits the shield to be shifted radially against the action of a spring 27 for the purpose of producing slack enough in the saw band to remove it and replace it from the sprocket wheels 5, 6.

The hub 32, of the wheel 5, is mounted on a sleeve 8 similar to the sleeve 9, and it is held on said sleeve by a screw 34 and a washer 35 similar to the screw 17 and washer 18 for the wheel 6. The spring 27 normally urges the pulley 5 to the left away from the wheel 6 to tighten the saw band 7 and resiliently holds the wheel 5 from radial movement. It is held in its retracted position when the band is to be removed by a particularly simple and compact releasable latch means including a sliding bolt 36 in the sleeve 8 and pressed outwardly by a coiled spring 37 within the sleeve, the bolt entering a passage or socket 38 in the casing 1, or in an insert 39 in a recess in the casing 1, when the shield 24 is retracted toward wheel 6, the bolt entering the socket when the bolt registers with the socket during the retracting operation. In so entering the socket, it moves outwardly a releasing pin 40 having a suitable handle or knob 41 at its outer end. After a new band has been replaced on the wheels, the bolt is unlatched by pressing downwardly on the bolt 40, to push the bolt out of the socket 38. These shields 12 and 24 enclose the upper sides of the wheels 5, 6, and the rim, with the exception of the portions toward each other where the upper and lower runs of the band are tangent to the wheels.

As best seen in Figure 4, the means for guiding the band 7 off the cylindrical periphery of the inclined toothed sprocket wheel 5 into a vertical plane in the cutting zone, and for guiding it from its vertical position onto the cylindrical periphery of the inclined power pulley 5, as the portions of the band pass out of the cutting zone onto the power wheel 6, consists of a spiral surface at 42 on one side of a passage 43, there being a surface 42 and passage 43 for each wheel 5, 6. These passages are located on the open ends of the shields 24 and 12 on the lower sides thereof, and are in a general direction tangent to the wheels, but the inclined spirally twisted surface of each inclines or twists outward relative to the tangent plane.

The construction shown in Figure 4, which is a fragmentary view looking upwardly in Figure 1, is illustrative of this spiral passage for each of the wheels 5, 6. In Figure 4, the periphery of the wheel and the band on it is in perspective. The spiral surface 42 twists the band as it leaves the wheel into a vertical plane with a long easy twist and a minimum of cross strains on the band, the perforations 70 and the pins 59, 60, as the band leaves the wheel 5 and as it moves onto the wheel 6. This twisting means for the wheel 6 turns the band from a vertical plane tangent to the cylindrical periphery of the inclined wheel 6.

In order to hold the portion of the band in the cutting zone firmly in vertical position, means, as blocks 44, are provided bifurcated and arranged astride the portion of the band in the cutting zone at opposite ends of the cutting zone, these being alined with the exit and inlet passage 43 of the spiral twisting means. As seen in Figure 4, each of these blocks 44 is guided in a bracket 45 fixed to the shield 24 or 12. These blocks 44 are shiftable when the band is to be removed and replaced relatively to the brackets 45, and as here shown, each block is shifted by means of an angle lever 46 or 47 pivoted at its angle at 48 or 49 and connected by a link 50 or 51, each of which is pivoted to one of the blocks 44. Each link 50 or 51 forms a toggle with one of the arms of the levers 46, 47, and when the blocks are in operative position, the toggles are in the dead center line of the toggle, and hence lock the blocks in operative position. Operating the handle end of the levers 47 to fold the toggle, lift the blocks 44 upwardly away from the band, so that the band may be readily removed upon shifting of the shield 24, as to the right, against the action of the spring 27, as before described. Each block 44 is bifurcated and includes a body and a face plate, as seen in Figures 6, 7 and 8. The body of the block slides on the adjacent bracket 45 and is secured thereto by a stud 80 extending through an upright slot 81 in the bracket and threading into the body of the block 44, and nuts 62 on the outer end of the stud and compressing a spring washer 52 between them and the opposing surface of the bracket 45. The body of the block is also shown as formed with a guide rib 63 in a groove 64 countersunk with respect to the slot 81. A screw 65 holds the bifurcations of the block 44 together as a unit. The bifurcations are spaced apart at S forming a passage for the saw band 7. During the operation of the lever 46, or 47, in one direction, the toggle formed by the lever arm and the link 50, or 51, folds, lifting the block 44 so that it frees the saw band from the spaces S. When the saw band 7 is replaced, a reverse movement of the lever 46, or 47, straightens the toggle and lowers the block 44 so that the saw band is again received in the space S.

The use of the words "vertical," "horizontal," herein is for convenience and illustration only, as the saw is usually used to cut material with the portion of the band in cutting position in a vertical plane. The saw may be provided with an abutment for the work, located at the end of the cutting zone towards which the saw moves in the direction of the arrow (Figure 1) and tends to drag the work or piece being sawed. 54 designates the abutment, here shown as pivoted at 55 to the adjacent bracket 45 and movable on its pivot out of position to act as an abutment when it is not necessary to use it.

This saw is portable and intended primarily to be used for such work as cutting off bars, shafts, etc., and to be carried to the stockroom where shafts, or bars, may be pulled out endwise from the racks, or shelves, and a piece of desired length may be sawed off by placing the saw with a portion of the band in the cutting zone against the bar, or shaft, and with the bar, or shaft, against the abutment 54. It may also be used to saw off pieces when the pieces are held in a vise, and in other situations.

During movement of the band, the tension on the saw is for by far the most part in a lineal direction, with very little, if any, transverse strains tending to tear it, this being due to the spiral surfaces 42 and the holding blocks 44. The relative location of the sprocket wheels at an oblique angle to the vertical plane of the portion of the saw in the cutting zone and also relative to the body, makes the saw particularly compact, insofar as both widthwise and height dimensions are concerned.

As a precaution to keep the saw teeth from becoming clogged, means may be provided to eject particles, chips, etc., created by the sawing, from between the saw teeth during the travel of the saw band. As the band travels in one direction only through the cutting zone, the saw teeth do not become clogged. However, in cutting some articles, as electric cables, particles or dust from the soft insulation around the wires, and from the soft metals, as lead, may tend to clog the saw teeth.

The saw teeth cleaning, or the chip or particle ejecting means includes a wiper or brush arranged to engage the saw teeth during the travel of the saw band, and to press in a lateral or angular direction against the teeth. As seen in Figures 1 and 2, the ejector comprises a rotatable brush 60 mounted in the shield 24 for the sprocket wheel 6 in position to press against the inner side of the margin of the saw band 7 just after the upper run of the band leaves the wheel 6 in its travel to the wheel 5. The inherent tension of the band presses its toothed margin laterally against the brush or wheel 60. The brush or wheel is provided with wire bristles which enter the spaces between the saw teeth and eject any particles lodged therein. The wheel 60 is rotatably mounted so that it runs as an idler on a threaded stud or screw 61 threading in a boss 62 on the inner side of the shield 24 for the sprocket wheel 6 near the point where the saw band 7 leaves the wheel 6.

What I claim is:

1. A power band saw comprising a horizontal casing, wheels mounted on the casing at opposite ends thereof, a saw band running over the wheels with the outer run of the band farthest from the casing between the wheels being the cutting portion of the band, a motor mounted in the casing, motion transmitting means between it and one of the wheels, the wheels being arranged at an oblique angle to a horizontal plane and the cutting portion of the band between the wheels being arranged in a vertical plane, and the other wheel being mounted to shift radially toward and from the power actuated wheel for providing slack in the band for facilitating the removal and replacing thereof, spring means biased to shift said other wheel away from the power actuated drive wheel and thus hold the band taut, and a releasable latch operable to hold the wheel in position when retracted against the spring.

2. In a power band saw comprising a horizontal casing, wheels mounted on the casing at opposite ends thereof, a saw band running over the wheels with the outer run of the band farthest from the casing between the wheels being the cutting portion, a motor mounted in the casing, motion transmitting means between it and one of the wheels, the wheels being arranged at an oblique angle to a horizontal plane and the cutting portion of the band between the wheels being arranged in a vertical plane and the other wheel being mounted to shift radially toward and from the power actuated wheel for providing slack in the band for facilitating the removal and replacing thereof, spring means biased to shift said other wheel away from the power actuated drive wheel and thus hold the band taut, and a releasable latch operable to hold the wheel in position when retracted against the spring, the latch including a spring-pressed bolt arranged axially of the wheel for entering a socket provided in the casing located to receive the bolt when the spring pressed wheel is retracted against the spring to slacken the band, and the release means including a plunger carried by the casing and alined with the bolt when the spring pressed wheel is in retracted position operable to push the bolt in the socket out of the socket to permit the spring to react.

3. In a power band saw comprising a casing having a motor carried thereby, wheels rotatably mounted at opposite ends of said casing, a saw band running over the wheels with one run of the band between the wheels being the cutting run, motion transmitting means between the motor and one of the wheels, the wheels being disposed at an oblique angle to a horizontal plane, the cutting run of the saw band between the wheels being arranged in a vertical plane, elongated means carried by the casing and providing a surface of a length substantially equal to the radius of the adjacent wheel for effecting twisting of said saw band from a plane substantially tangential to the adjacent wheel to the vertical plane of the cutting run, and a guide block adjacent each wheel engaged by the saw band for maintaining the saw band substantially free from lateral displacement while passing through the cutting zone.

4. In a power band saw comprising a casing having a motor carried thereby, wheels rotatably mounted at opposite ends of said casing, a saw band running over the wheels with one run of the band between the wheels being the cutting run, motion transmitting means between the motor and one of the wheels, the wheels being disposed at an oblique angle to a horizontal plane, the cutting run of the saw band between the wheels being arranged in a vertical plane, a stationary guide block for the saw band provided with a smooth twisted spiral surface substantially tangent at one end to one wheel and twisting into a vertical plane at the other end, said saw band being in sliding engagement with said spiral surface when passing from the last named wheel into the cutting zone, whereby said saw band is braced by said spiral surface when leaving said last named wheel and twisted into a vertical plane when entering the cutting zone, and means carried by said casing for engagement with said saw band for substantially maintaining the same from lateral displacement in the cutting zone.

5. In a power band saw comprising a casing having a motor carried thereby, wheels rotatably mounted at opposite ends of said casing, a saw band running over the wheels with one run of the band between the wheels being the cutting portion, motion transmitting means between the motor and one of the wheels, the wheels being disposed at an oblique angle to a horizontal plane, the cutting run of the saw band being arranged in a vertical plane, a bracket carried by the casing adjacent each end of the cutting run of the saw band, elongated means providing a surface of a length substantially equal to the radius of the adjacent wheel for effecting twisting of said saw band from a plane substantially tangential to the adjacent wheel to the vertical plane of the cutting run, and a guide block adjacent each wheel and engaged by the saw band for maintaining the saw band substantially free from lateral displacement while passing through the cutting zone, each bracket providing a common support for the elongated means and guide block adjacent each wheel.

6. In a power band saw comprising a casing having a motor carried thereby, wheels rotatably carried at opposite ends of said casing, means operatively interconnecting said motor with one of said wheels, a saw band engaged over said wheels with one run of the band between the wheels being the cutting run, the wheels being disposed at an oblique angle to a horizontal plane and the cutting run of the saw band being disposed in a vertical plane, a stationary guide block for the saw band disposed adjacent one of the wheels, said block being provided with a smooth twisted spiral surface extending from a plane substantially tangential to the adjacent wheel to a vertical plane, said spiral surface twisting outwardly of the plane tangential to the adjacent wheel at the position where the saw band loses contact with the wheel, said saw band being in sliding engagement with said spiral surface when passing between one wheel and the cutting zone and being braced by said spiral surface and twisted from the plane tangent to the adjacent wheel to the vertical plane of the cutting run, and means engaging said saw band at each end of the cutting run for substantially maintaining the same from lateral displacement in the cutting zone.

ELMER P. SACREY.

REFERENCES CITED

The following references are of record in the file of this patent:

UNITED STATES PATENTS

| Number | Name | Date |
| --- | --- | --- |
| 213,222 | Mayo | Mar. 11, 1879 |
| 1,072,200 | Wright | Sept. 2, 1913 |
| 1,438,540 | McKenna | Dec. 12, 1922 |
| 1,449,805 | Arnold et al. | Mar. 27, 1923 |
| 1,453,335 | Bennett | May 1, 1923 |
| 1,516,529 | Hall | Nov. 25, 1924 |
| 1,530,682 | Lyman | Mar. 24, 1925 |
| 1,721,722 | Wells | July 23, 1929 |
| 1,938,200 | Wells | Dec. 5, 1933 |
| 2,113,931 | Biro | Apr. 12, 1938 |
| 2,311,268 | Tannewitz | Feb. 16, 1943 |

FOREIGN PATENTS

| Number | Country | Date |
| --- | --- | --- |
| 89,985 | Switzerland | Nov. 16, 1921 |
| 489,778 | Germany | Feb. 6, 1932 |
| 863,640 | France | Jan. 6, 1941 |